(12) United States Patent
Kureshy et al.

(10) Patent No.: US 7,584,241 B2
(45) Date of Patent: Sep. 1, 2009

(54) SYSTEM AND METHOD FOR COMMUNICATIONS MANAGEMENT AND DATA EXCHANGE

(75) Inventors: Arif Kureshy, Sammamish, WA (US); Frederick G. Pace, Everett, WA (US); Joseph F. Welch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 10/102,560

(22) Filed: Mar. 19, 2002

(65) Prior Publication Data

US 2002/0152268 A1 Oct. 17, 2002

Related U.S. Application Data

(60) Provisional application No. 60/277,104, filed on Mar. 19, 2001.

(51) Int. Cl.
*G06F 15/16* (2006.01)
(52) U.S. Cl. ............... 709/203; 709/201; 709/202; 709/223; 709/250
(58) Field of Classification Search ......... 709/201–232, 709/246, 247, 250; 455/412.1, 435.1
See application file for complete search history.

(56) References Cited

U.S. PATENT DOCUMENTS

| | | | |
|---|---|---|---|
| 5,742,772 A | | 4/1998 | Sreenan |
| 5,878,127 A * | | 3/1999 | Fleischer, III .......... 379/221.08 |
| 6,212,555 B1 * | | 4/2001 | Brooks et al. .............. 709/219 |
| 6,289,212 B1 * | | 9/2001 | Stein et al. ............... 455/412.1 |
| 6,314,108 B1 * | | 11/2001 | Ramasubramani et al. .. 370/465 |
| 6,327,364 B1 * | | 12/2001 | Shaffer et al. .......... 379/265.02 |
| 6,333,973 B1 * | | 12/2001 | Smith et al. .............. 379/88.12 |
| 6,457,060 B1 * | | 9/2002 | Martin et al. ................ 709/245 |
| 6,463,464 B1 * | | 10/2002 | Lazaridis et al. ............ 709/207 |

(Continued)

FOREIGN PATENT DOCUMENTS

EP 0774878 A 5/1997

(Continued)

OTHER PUBLICATIONS

Calsyn, Presence Information Protocol Requirements; draft-dusseault-pipr-00-txt, Standard-Working-Draft, Internet Engineering Task Force, IETF, CH, Feb. 9, 1998.

(Continued)

*Primary Examiner*—Nathan J Flynn
*Assistant Examiner*—Mohamed Wasel
(74) *Attorney, Agent, or Firm*—Vierra Magen Marcus & DeNiro LLP

(57) ABSTRACT

A system and method for communications management and data exchange are provided. A mobile device includes one or more client applications that communicate with one or more server-based applications. The mobile device includes application bridge components for routing incoming and outgoing messages from the server-based application to one or more client applications. The server-based applications also communicate to each other and the client applications via a server-based application bridge. Both application bridges are operable to obtain transformation and routing information from the message and process the message accordingly. In the event communication becomes intermittent, the client-based application bridge and the server-based application bridge manage the messages and ensure message delivery.

34 Claims, 11 Drawing Sheets

U.S. PATENT DOCUMENTS

| | | | |
|---|---|---|---|
| 6,480,957 B1 * | 11/2002 | Liao et al. | 713/170 |
| 6,654,601 B2 * | 11/2003 | Picoult et al. | 455/412.1 |
| 6,701,378 B1 * | 3/2004 | Gilhuly et al. | 709/249 |
| 6,721,288 B1 * | 4/2004 | King et al. | 709/203 |
| 7,010,303 B2 * | 3/2006 | Lewis et al. | 455/445 |
| 7,099,339 B1 * | 8/2006 | Wang et al. | 370/401 |
| 2002/0021693 A1 * | 2/2002 | Bruno et al. | 370/386 |
| 2002/0057674 A1 * | 5/2002 | Shenkman et al. | 370/352 |
| 2002/0059380 A1 * | 5/2002 | Biliris et al. | 709/206 |
| 2002/0077130 A1 * | 6/2002 | Owensby | 455/466 |
| 2002/0126633 A1 * | 9/2002 | Mizutani et al. | 370/329 |
| 2002/0196793 A1 * | 12/2002 | Samba et al. | 370/401 |
| 2004/0028213 A1 * | 2/2004 | Goss | 379/265.09 |
| 2004/0116119 A1 * | 6/2004 | Lewis et al. | 455/435.1 |
| 2004/0209632 A1 * | 10/2004 | Link et al. | 455/466 |
| 2005/0159136 A1 * | 7/2005 | Rouse et al. | 455/412.1 |
| 2008/0049734 A1 * | 2/2008 | Zhakov et al. | 370/352 |

FOREIGN PATENT DOCUMENTS

| | | | |
|---|---|---|---|
| EP | 0806731 A | 11/1997 | |
| GB | 0 993 165 A2 * | 4/2000 | 709/219 |

OTHER PUBLICATIONS

Rosenberg et al, draft-rosenberg-sip-pip-00.txt: SIP For Presence, IETF Internet Draft, Nov. 13, 1998, pp. 1-22.

European Search Report dated Feb. 6, 2009 in European Patent Application No. 02721490.7.

* cited by examiner

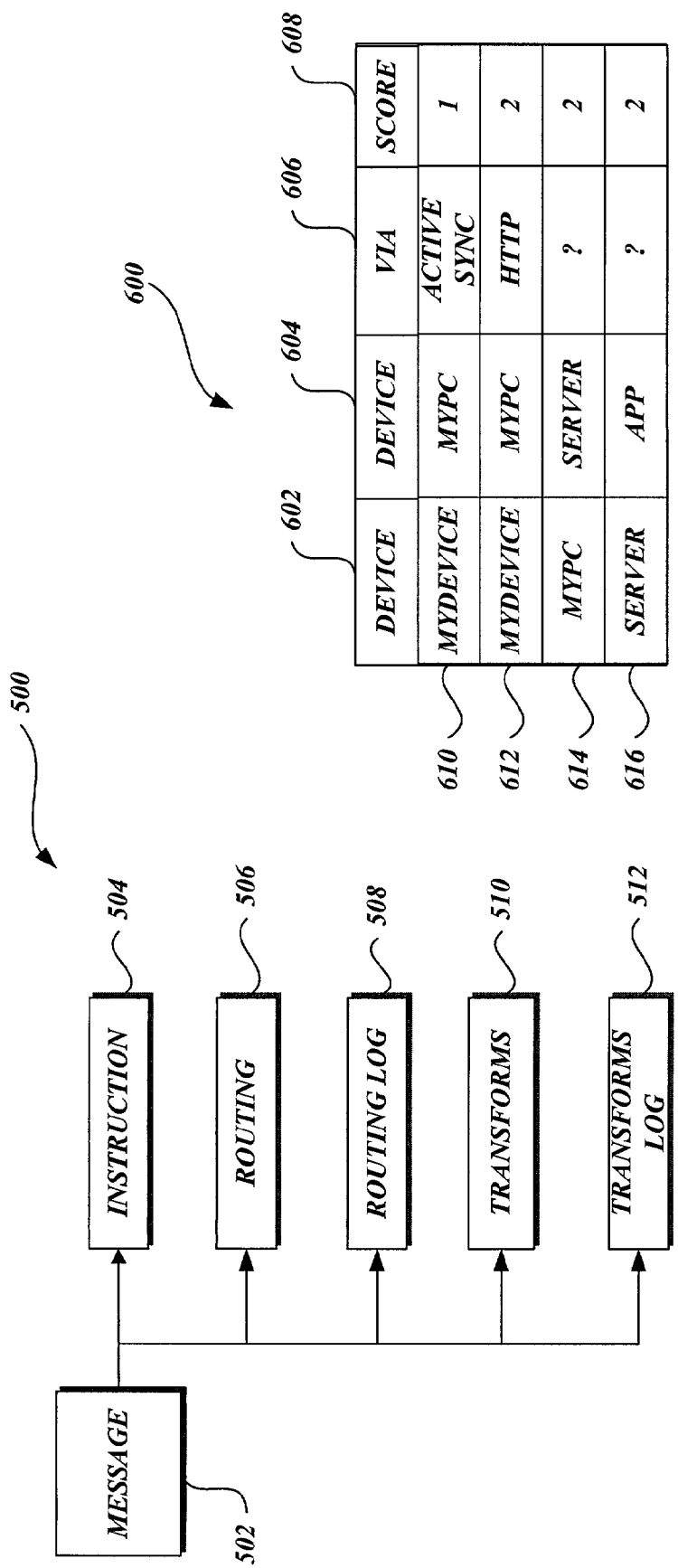

SYSTEM AND METHOD FOR COMMUNICATIONS MANAGEMENT AND DATA EXCHANGE

CROSS-REFERENCE TO RELATED APPLICATION

This application claims the benefit of U.S. Provisional Application No. 60/277,104 entitled SYSTEMS AND METHODS FOR MOBILE APPLICATIONS and filed on Mar. 19, 2001. U.S. Provisional Application No. 60/277,104 is incorporated by reference herein.

FIELD OF THE INVENTION

In general, the present application relates to computer software and communication networks, and in particular, to a system and method for communications management and data exchange through an application bridge.

BACKGROUND OF THE INVENTION

Generally described, computing devices, such as personal computing devices, provide computer users with a variety of functions. For example, most computing devices include word processing software applications that allow computer users to generate electronic documents. In a typical single user computing environment, the computing device manages electronic data, such as the electronic documents, on memory devices physically located on the device.

Most computing devices can utilize computing device communication networks, such as the Internet, that allow the computing devices to access data from other computing devices connected to the same communication network. One example of such an implementation is the transmission of electronic messages ("e-mail") between computing devices. A more complex example includes the interaction between software applications between two computing devices to provide user functionality. More specifically, in one application, a user at a computing device may access data, such as word processing data, stored on another computing device in a common communications network. Additionally, the user at the computing device may also access other software applications that are provided by another computing device and that are not entirely maintained on the user' computing device. These types of applications can be referred to generally as server-based applications.

The development of mobile computing devices, such as palm-top computing devices, hand-held computing devices, personal digital assistants, pagers, mobile telephones, and the like, provide computer users with additional functionality. For example, a computer user may maintain data on the mobile device that can be accessed as needed by the user in various geographic areas. Additionally, in some embodiments, mobile devices can include wired connections and/or wireless connections that allow for the transmission of data between the mobile device and other computing devices on an intermittent basis. Nevertheless, many mobile devices are limited as to the amount of data that may be stored on the device and they number and type of software applications that may be utilized by the mobile device.

In an attempt to mitigate the deficiencies associated with mobile devices, some mobile devices can use server-based applications to provide data storage over a communication network. For example, the mobile device can recall electronic data maintained on high-storage capacity server computing devices as needed by the computing device. Additionally, the mobile device can utilize server-based application as a software distribution tool to provide executable instructions that allow the mobile device to offer additional software applications. However, most server-based application implementations require a continuous communication network connection to exchange data. Accordingly, if a mobile device has intermittent connectivity, such as due to varying wireless communication availability, incoming or outgoing data can be lost. Additionally, in most conventional implementations, if the network connection is lost, externally provided application programs might become unavailable. Thus, the traditional server-based application implementation is deficient in an intermittent connectivity environment, such as with a mobile device.

One attempt to implement a server-based solution in an intermittent connectivity environment involves the use of a queuing software application that manages message transmission between a mobile application and a server-based application. In such an embodiment, if communications are not available, the queue software application obtains outgoing messages and stores the messages in the order in which they are received. When communications become available, the messages are transmitted. However, many typical queuing software applications are implemented in embodiments, such as electronic mail delivery applications, that do not require reliability and security as part of the message delivery. For example, traditional queuing software applications do not incorporate routing determination functionality or support multiple communication protocols. Additionally, the traditional queuing software application does not provide additional data processing without requiring additional software application components working in conjunction with the queuing software application. For example, traditional queuing software applications do not support multiple communication protocol communication models, in-order message delivery, complex routing and routing tracking as part of a standard software application. Accordingly, by requiring additional software application components to provide the additional functionality, traditional queuing software applications remain deficient for not integrating complex data processing in a manner that is scaleable and applicable to a wide variety of networked devices.

Thus, based upon the above-referenced problems associated with the prior art, there is a need for a system and method for facilitating communications management and data exchange in an intermittent connectivity communication environment.

SUMMARY OF THE INVENTION

A system and method for communications management and data exchange are provided. A mobile device includes one or more client applications that communicate with one or more server-based applications. The mobile device includes application bridge components for routing incoming and outgoing messages from the server-based application to one or more client applications. The server-based applications can also communicate to each other and the client applications via a server-based application bridge. Both application bridges are operable to obtain transformation and routing information from the message and process the message accordingly. In the event communication becomes intermittent, the client-based application bridge and the server-based application bridge manage the messages and ensure message delivery.

In accordance with an aspect of the present invention, a computer system for communications management and data exchange is provided. The computer system includes a communication network operable to facilitate the transmission of messages. The computer system also includes a remote client computing device having at least one client-based application and a client-based application bridge. The remote client computing device is in intermittent communication with the communication network. The computer system further includes a server-based computing device having at least one server-server-based application and a server-based application bridge. The server-based communication device is in communication with the communication network. Additionally, the server-based application is operable to generate messages for the client-based application and the client-based application is operable to generate messages for the server-based application. Still further, the client-based application bridge and server-based application bridge are operable to manage the transmission of messages between the client-based application and the server-based application when the remote client computing device is not in communication with the communication network.

In accordance with another aspect of the present invention, a computer-readable medium having computer-executable modules for communications management is provided. The computer-executable modules include a manager component operable to manage the processing of a message and a data store component in communication with the manager component and operable to store messages. The computer-executable components also include a protocol component in communication with the manager component and operable to communicate with a communications network. Communications with the communications network is intermittent. Additionally, the computer-executable modules include an application protocol interface component operable to interface with an application program. The application generates and receives messages.

In accordance with another aspect of the present invention, a method for processing message communications in a communication network having intermittent connectivity is provided. An application bridge obtains a message and transforms the message according to transformation information obtained from the message. The application bridge determines a routing path according to routing information obtained from the message and transmits the message if communications are available.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a block diagram illustrative of a message including various communication, processing, and routing data streams in accordance with the present invention;

FIG. 6 is a block diagram illustrative of a routing table utilized by an application bridge to route data in accordance with the present invention;

DETAILED DESCRIPTION OF THE PREFERRED EMBODIMENT

Figure 9:
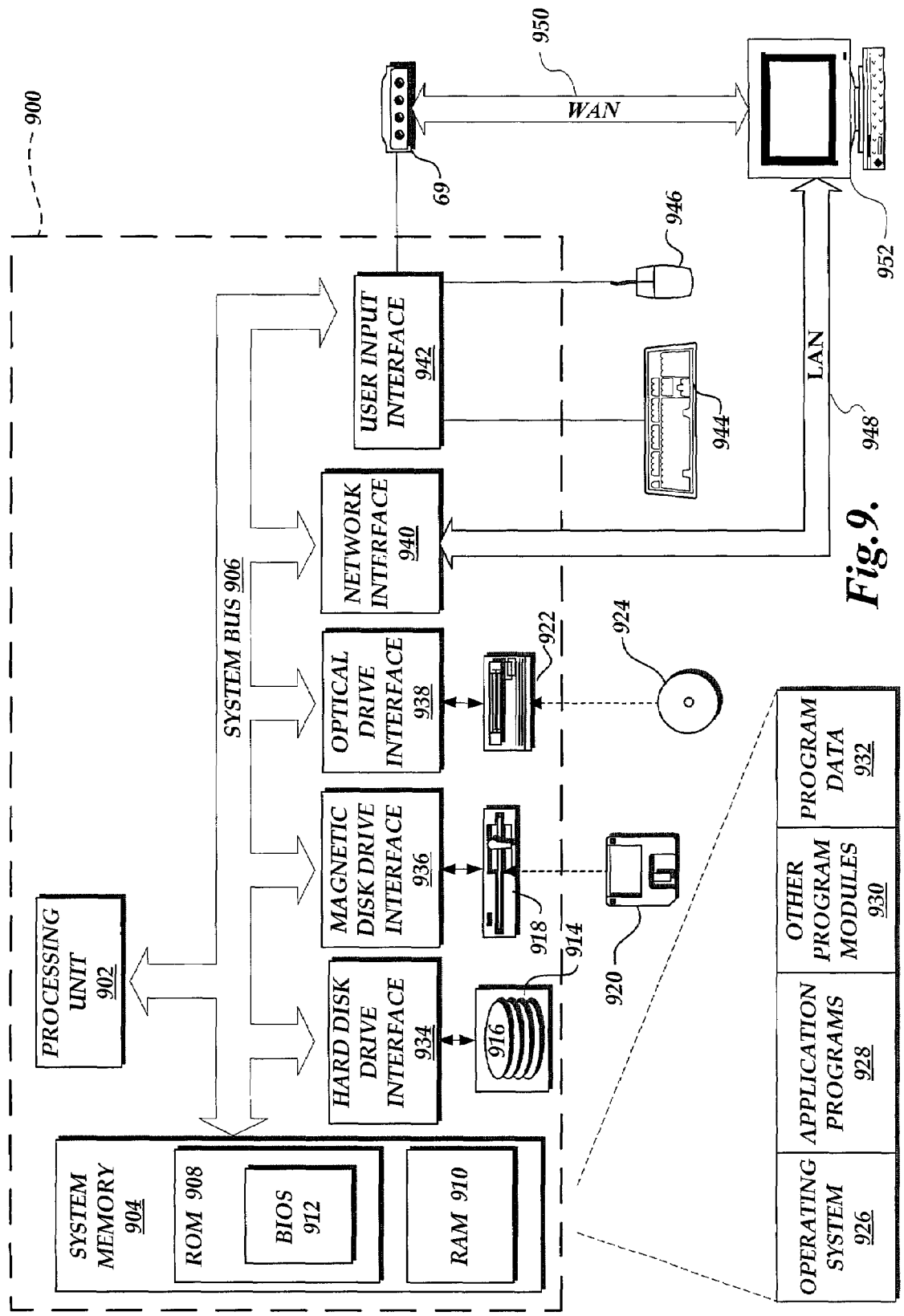
FIG. 9 is a block diagram depicting an illustrative architecture for a computing device environment suitable for implementing aspects of the present invention.

FIG. 9 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 900. Components of a computer 900 include, but are not limited to, a processing unit 902, a system memory 904, and a system bus 906 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 900 typically includes a variety of computer-readable media. Computer-readable media can be any available media that can be accessed by the computer 900 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 900.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 904 includes computer storage media in the form of volatile and/or non-volatile memory such as read only memory (ROM) 908 and random access memory (RAM) 910. A basic input/output system 912 (BIOS), containing the basic routines that help to transfer information between elements within the computer 900, such as during start-up, is typically stored in ROM 908. RAM 910 typically contains data and/or program modules that are immediately accessible to and/or presently being operated on by the processing unit 902. By way of example, and not limitation, FIG. 9 illustrates an operating system 926, application programs 928, other program modules 930, and program data 932.

The computer 900 may also include removable/non-removable, volatile/non-volatile computer storage media. By way of example only, FIG. 9 illustrates a hard disk drive 914 that reads from or writes to non-removable, non-volatile magnetic media 916, a magnetic drive 918 that reads from or writes to a removable, non-volatile magnetic disk 920, and an optical disk drive 922 that reads from or writes to a removal, non-volatile optical disk 924, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 914, magnetic disk drive 918, and optical disk drive 922 may be connected to the system bus 906 by a hard disk drive interface 934, a magnetic disk drive interface 936, and an optical drive interface 938, respectively. Alternatively, the hard disk drive 914, magnetic disk drive 918, and optical disk drive 922 are typically connected to the system bus 906 by a Small Computer System Interface (SCSI).

The drives and their associated computer storage media discussed above and illustrated in FIG. 9, provide storage of computer-readable instructions, data structures, program modules and other data for the computer 900. In FIG. 9, for example, the hard disk drive 934 is illustrated as storing the operating system 926, application programs 928, other programs 930, and program data 932. Note that these components can either be the same as or different from the operating system 926, the other program modules 930, and the program data 932. A user may enter commands and information into the computer 900 through an input device such as a keyboard 944 and/or a pointing device 946, commonly referred to as a mouse, track ball or touch pad. Other input devices (not shown) may include a microphone, a joystick, a game pad, a satellite dish, a scanner, or the like. These and other input devices are often connected to the processing unit 902 through user input interface 942 and may be connected by other interface and bus structures, such as a parallel port, game port or other universal serial bus (USB).

The computer 900 may operate in a network environment using logical connections to one or more remote computers 954. The remote computer 954 may be a personal computer, a server, a router, a network PC, a peer device or other common network node, and typically includes many or all of the elements described above relative to the computer 900, although only a memory storage device has been illustrated in FIG. 9. The logical connections depicted in FIG. 9 include a local area network (LAN) 948 and a wide area network (WAN) 952, but also include other networks. Such network environments are commonplace in office, enterprise-wide computer networks, Intranets, and the Internet.

When used in a LAN network environment, the computer 900 is connected to the LAN 948 through a network interface adapter 940. When used in a WAN network environment, the computer typically includes a modem 950 or other means for establishing communications over the WAN 952, such as the Internet. The modem, which may be internal or external, may be connected to the system bus 906 via the serial port interface or other appropriate mechanism. In a networked environment, program modules depicted relative to the computer 900, or portions thereof, may be stored in the remote memory storage device. By way of example, and not limitation, FIG. 9 illustrates remote application programs 928 as residing on memory device 904. It will be appreciated that the network connections shown are exemplary in other means of establishing communication between the computers may be used. Although many other internal components of the computer 900 are not shown, those of ordinary skill will appreciate that such components and their interconnection are well known. Accordingly, additional details concerning the internal construction of the computer 900 need not be disclosed in connection with the present invention.

Those skilled in the art will understand that program modules such as the operating system 926, the application programs 928 and data 932 are provided to the computer 900 via one of its memory storage devices, which may include ROM 908, RAM 910, hard disk drive 914, magnetic disk drive 918, or optical disk device 922. The hard disk drive 914 is used to store data 932 and the programs, including the operating system 926 and application programs 928.

When the computer 900 is turned on or reset, the BIOS 912, which is stored in ROM 908 instructs the processing unit 902 to load the operating system 926 from the hard disk drive 914 into the RAM 910. Once the operating system 926 is loaded into RAM 910, the processing unit executes the operating system code and causes the visual elements associated with the user interface of the operating system to be displayed on the monitor. When a user opens an application program 928, the program code and relevant data are read from the hard disk drive and stored in RAM 910.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communications device, modem and temporary telephone, or a wireless link. The Internet has recently seen explosive growth by virtue of its ability to link computers located throughout the world. As the Internet has grown, so has the WWW.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by an number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

Figure 10:
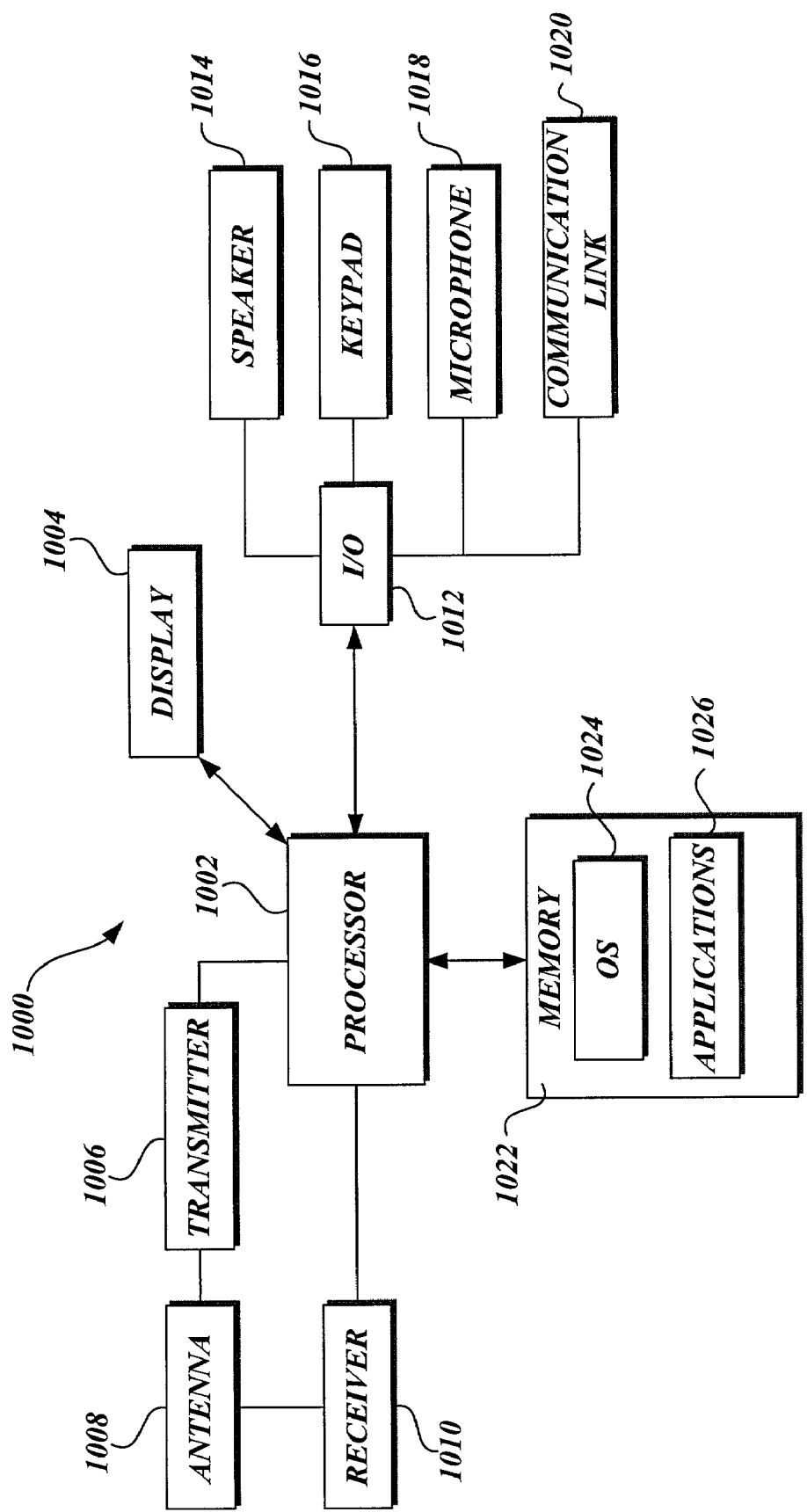
FIG. 10 is a block diagram depicting an illustrative architecture for a mobile computing device environment suitable for implementing aspects of the present invention.

With reference now to FIG. 10, an illustrative architecture for mobile device 1000 for implementing aspects of the present invention will be described. Those of ordinary skill in the art will appreciate that the mobile device 1000 includes many more components then those illustrated in FIG. 10. However, it is not necessary that all of these generally conventional components be shown in order to disclose an illustrative embodiment for practicing the invention. Additionally, those of ordinary skill in the art will further appreciate that alternative components and/or methods for establishing mobile communications is considered within the scope of the present invention.

As shown in FIG. 10, the mobile device 1000 includes a processor 1002, a display 1004 and a memory 1022. The display 1004 may include any variety of display devices including, but not limited to a liquid crystal display, a color display, and/or a light emitting diode display. Additionally, the display can also provide a touch screen interface. Also connected to the processor 1002 is an input/output interface 1012, which connects to a speaker 1014, a keypad 1016, a microphone 1018, and a communication link 1020, such as a base station connection. As would be readily understood by one skilled in the relevant art, alternative input/output configurations are considered to be within the scope of the present invention.

The mobile device 1000 can also include a transmitter 1006 and receiver 1010, which are connected to an antenna 1008 for sending and receiving wireless communications respectively. The mobile device 1000 may also include a modulator and demodulator for formatting data transmissions according to an air interface standard. It should be understood that the mobile device 1000 may be capable of operating with one or more air interface standards, modulation types and data accessing types without departing from the scope of the invention.

The memory 1022 generally comprises a RAM, a ROM and may also include a permanent mass storage device, such as a hard disk drive, tape driver, optical drive, floppy disk drive, CD-ROM, DVD-ROM, flash memory or removable storage drive. The memory 1022 stores an operating system 1024 for controlling operation of the mobile device 32. The memory 1022 also includes a number of additional applications 1026 that provide various functions to the mobile device 1000. In one aspect of the present invention, at least one application 1026 is operable to transmit and/or receive messages from external software applications, such as a server computing device. As would be readily understood, the memory 80 may contain additional applications for accessing multiple networks. It will be appreciated that these components may be stored on various computer-readable mediums and loaded into memory 80 using a drive medium associated with the computer-readable medium.

Generally described, the present application relates to a system and method for communications management and data exchange through the use of an application bridge. In an illustrative embodiment of the present invention, the present invention may be utilized in conjunction with a computing device, such as a mobile device 1000, having limited access to a data network. Although the present invention will described with respect to an illustrative mobile device 1000, one skilled in the relevant art will appreciate that the present invention is applicable to a number of devices having some computing resources. Additionally, although the present invention will be described with regard to embodiments having interruptible network communication, the present invention may be implemented in embodiments having a consistent network communication. Accordingly, the disclosed embodiments should not be construed as limiting.

Figure 1:
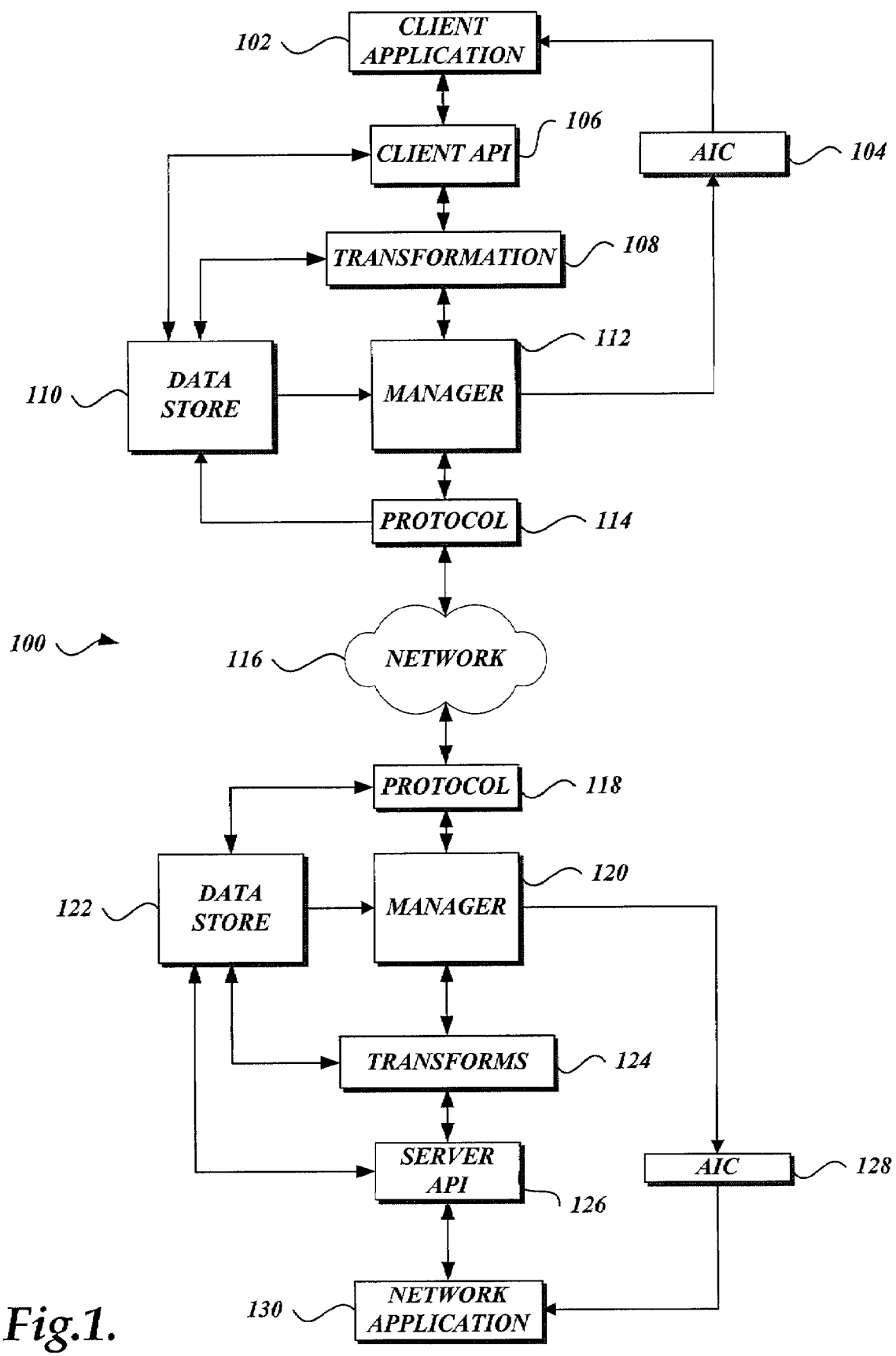
FIG. 1 is a block diagram illustrative of a communication management system including a remote client application in communication with a network application via bridge applications in accordance with the present invention.

With reference to FIG. 1, an illustrative communication management system 100 including a remote client application 102 in communication with a network application 130 will be described. Although the remote client application 102 and the network application 130 are illustrated in a server/client relationship, one skilled in the relevant art will appreciate that the two applications may also be configured in a peer-to-peer relationship. In an illustrative embodiment of the present invention, the remote client application 102 and the network application 130 exchange messages for facilitating the function of the remote client application. In an illustrative embodiment of the present invention, and as will be explained in greater detail below, a message can include a collection of data payloads and data streams. For example, the remote client application 102 may include a word processing application that exchanges word processing data files and/or word processing instructions with a word processing network application. One skilled in the relevant art will appreciate that remote client application can include applications such as multi-purpose applications, such as spreadsheet application programs, communication application programs, database application programs, and the like. Additionally, the remote client applications can include special-purpose application programs, such as an inventory accounting applications, data searching applications, gaming applications, and the like.

In an actual embodiment of the present invention, the remote client application 102 communicates with the network application 130 via an application bridge that includes several components. With reference to FIG. 1, the application bridge includes a client application protocol interface ("API") component 106 that provides an interface for incoming and outgoing messages to the client application 102. In an illustrative embodiment of the present invention, the application bridge can include a number of application integration components ("AIC") 104 that are optimized to transmit data to specific client applications 102. Generally, the AICs 104 implements a one-way communication model.

The application bridge can also include a transformation component 108 that is operable to transform messages. In an illustrative embodiment of the present invention, the transformation component 108 can implement two-way communication with other components in the application bridge and can facilitate data processing such as encryption, compression, watermarking, and the like. The application bridge can also include a data store component 110 for storing incoming and outgoing messages. As will be explained in greater detail below, the data store component 110 can maintain outgoing messages when network communication has been interrupted. Likewise, the data store component 110 can maintain incoming messages that are grouped with other messages or that are designated to be delivered in a particular order.

The application bridge can also include a manager component 112 that is operable to manage the state transitions of the incoming and outgoing messages. In an illustrative embodiment of the present invention, the manager component facilitates the transfer of messages to and from the other components of the application bridge. The application bridge can further include a protocol component 114 for facilitating the exchange of data between a mobile device 1000 and a network via various communication protocols. For example, the protocol component 114 may utilize the HTTP protocol to transmit and receive the messages. One skilled in the relevant art will appreciate that the protocol component 114 may also utilize additional communication protocols to transmit messages over different communication networks.

With continued reference to FIG. 1, the remote client application 102 exchanges messages over a communication network 116. In an illustrative embodiment of the present invention, the communication network 116 can include wireless networks such as cellular networks, IEEE 802.11 conforming networks, radio networks, satellite networks, and the like. Additionally, the communication network 116 can include wired networks, such as LANS, WANS, and the like. One skilled in the relevant art will appreciate that additional or alternative communication network standards may be practiced with the present invention. Additionally, one skilled in the relevant art will appreciate that additional network protocols may be associated with particular types of communication networks.

In a manner similar to the remote client application, the network application 130 also includes a server-based application bridge having several components. In an illustrative embodiment of the present invention, the server-based application bridge components have functions that are similar to the functions of the remote client application bridge. More specifically, the server-based application bridge includes a protocol component 118 operable to facilitate the exchange of data over the communication network 116. The server-based application bridge also includes a manger component 120 for managing the state transitions of the messages.

The server-based application bridge further includes a data store component 112 for storing incoming and outgoing messages and a transforms component 124 for processing the incoming and outgoing messages. The server-based application bridge includes a server API 126 for facilitating communication to and from server applications 130. Additionally, the server-based application bridge can include one or more AICs 128 for facilitating transmissions to specific server applications 130.

Although FIG. 1 illustrates the remote client application bridge and the server-based application bridge as having mirroring components, in an alternative embodiment of the present invention, the components of the remote client application bridge and/or the server-based application bridge may be modified. For example, a remote client not requiring any type of transformations, such as data compression or encryption, may omit the transformation component 108. Additionally, one skilled in the relevant art will appreciate that components of the remote client application bridge and the server-based application bridge may vary according to their respective designated uses (e.g., the amount of data being processed, the number of devices in communication at one time, and the like.) Likewise, some of the application bridge component functions may be divided into one or more additional components. All embodiments are considered to be with the scope of the present invention.

Figure 2:
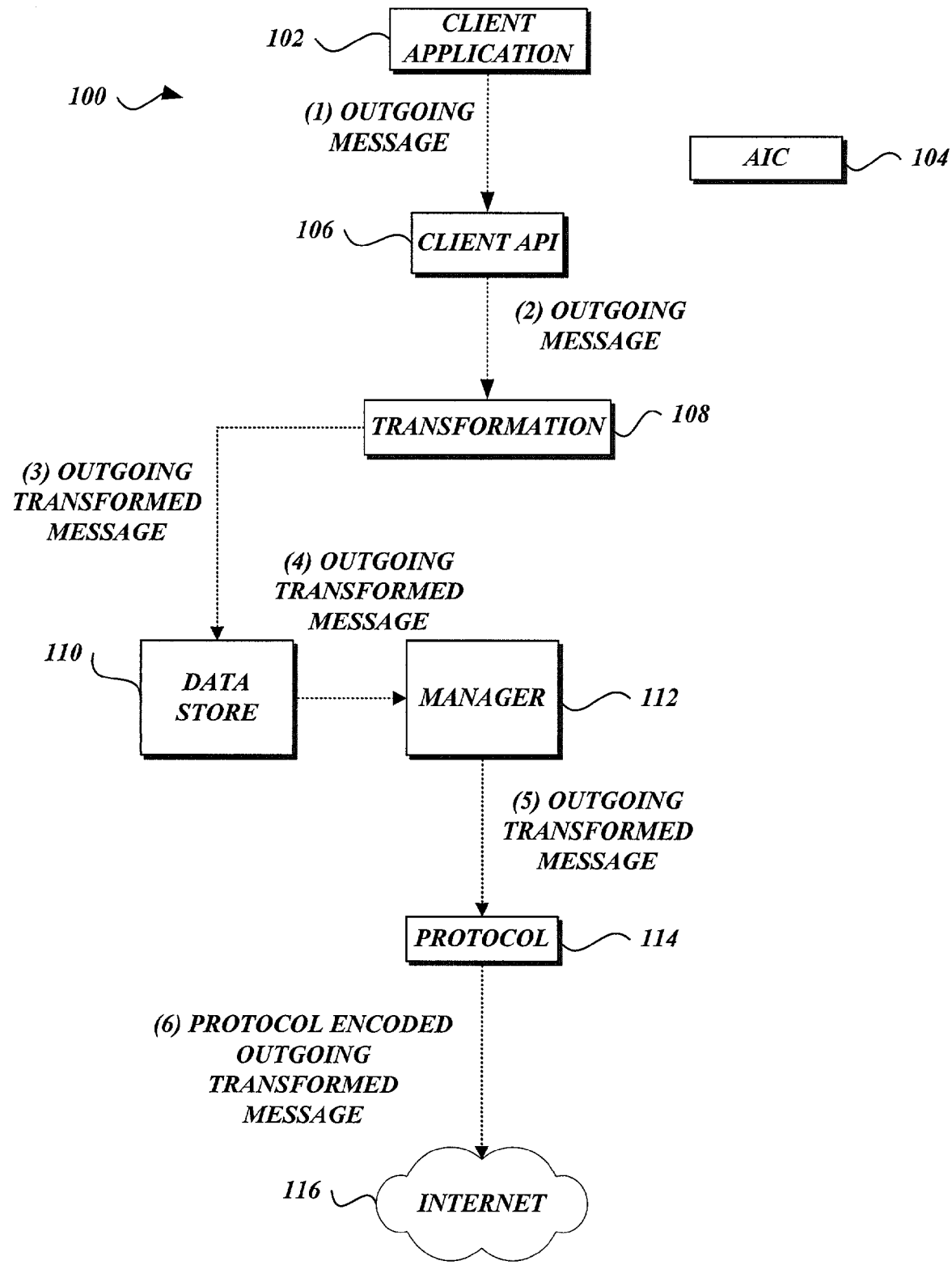
FIG. 2 is a block diagram of the communication management system of FIG. 1 illustrating the processing of an outgoing message by a bridge application in accordance with the present invention.
Figure 3:
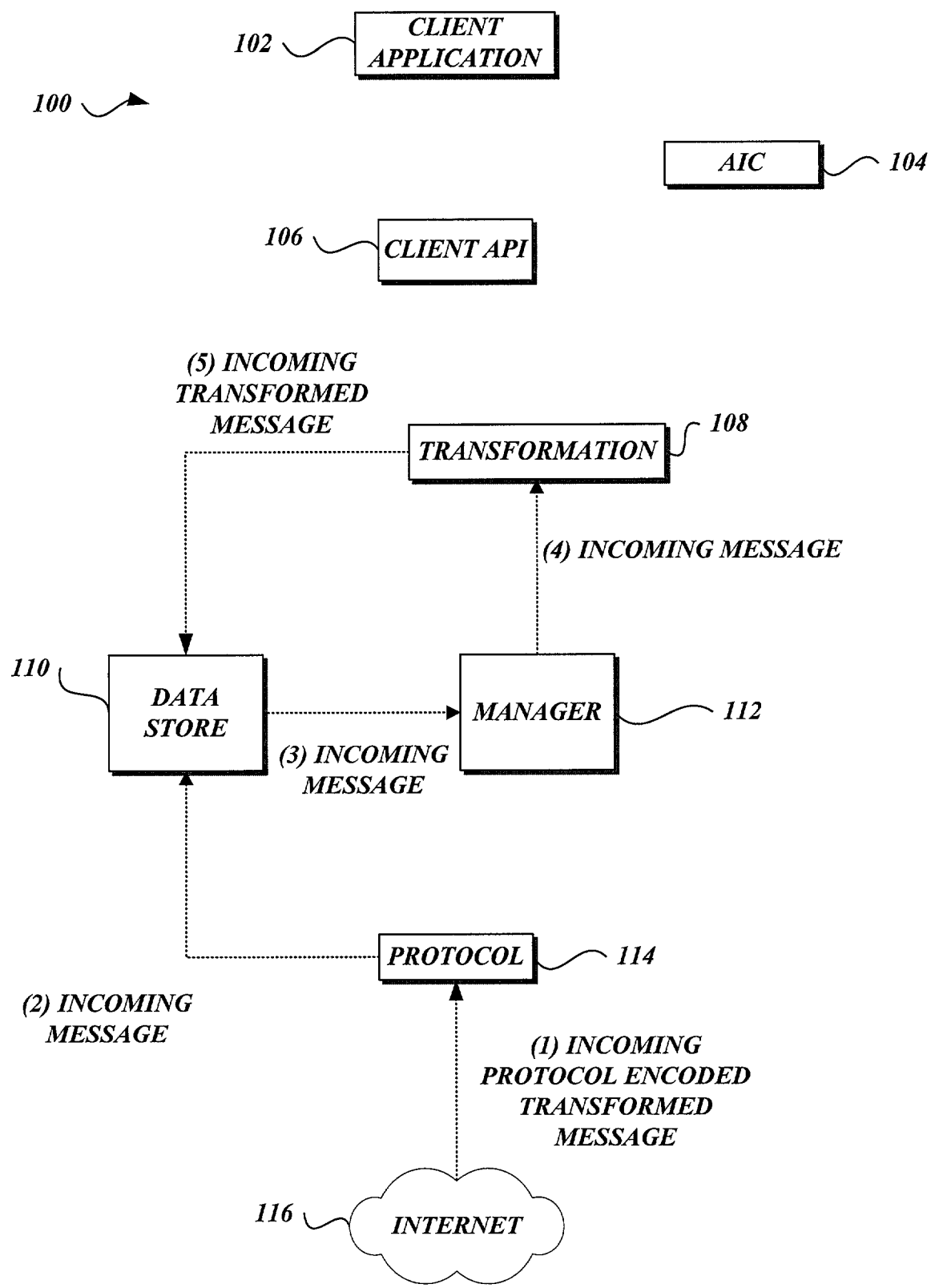
FIG. 3 is a block diagram of the communication management system of FIG. 1 illustrating the processing of an incoming message by a bridge application in accordance with the present invention.
Figure 4:
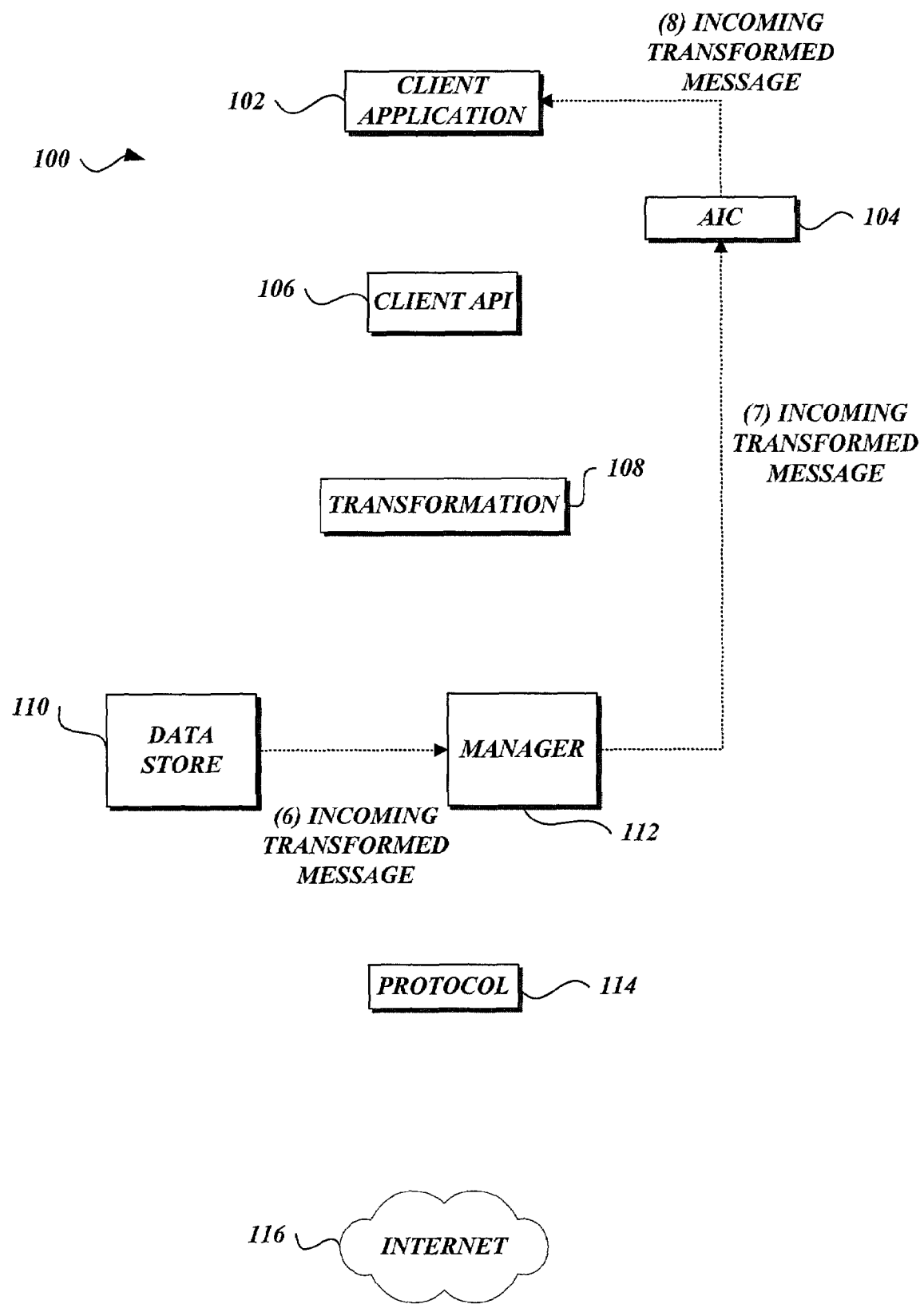
FIG. 4 is a block diagram of the communication management system of FIG. 1 illustrating the processing of an incoming message by a bridge application in accordance with the present invention.

FIGS. 2-4 are block diagrams of the communication management system 100 (FIG. 1) illustrating the processing of outgoing and incoming messages respectively. Although FIGS. 2-4 illustrate the processes with the respect solely to the remote client application 102, the processes are applicable in like to the network application 130. With reference to FIG. 2, an outgoing message is generated by the client application 102 and sent to the client API 106. As will be explained in greater detail below, the outgoing message can include data to be transmitted, processing instructions, routings instructions, and the like. If the outgoing message requires processing, the client API component 106 transmits the message to the transformation component 108 for further processing.

Upon completion with processing, the transformation component 108 transmits the processed message to the data store component 110. The data store component 100 maintains the information and informs the manager component 112 that the message is ready for transmission. In an actual embodiment of the present invention, the manager component 112 can determine routing path for the outgoing message. For example, if the mobile device 1000 has both wired connections, such as a direct connection to a personal computer, and wireless connections, the manager component 112 can determine which routing path will be used. If the mobile device 1000 associated with the client application 102 has network connectivity, the outgoing message is transferred to the protocol component 114 for transmission. In an illustrative embodiment of the present invention, the protocol component 114 can include any number of protocols for use with the communication protocol requirements of the routing path selected by the manager component 114.

Referring now to FIGS. 3 and 4 an incoming message process will be explained. With reference to FIG. 3, an incoming message is received by the protocol component 114 and decoded. The protocol component 110 transmits the decoded message to the data store component 110, which informs the manager component 112 that a message has been received. If the incoming message has been processed, the manager component 112 transmits the message to the transformation component 108 to be transformed. For example, the message may be uncompressed or decrypted. The transformation component 108 then transmits the message back to the data store component 110.

With reference now to FIG. 4, the data store 100 transmits the transformed message to the manager component 112. In an illustrative embodiment of the present invention, prior to forwarding the message, the manager component 112 can verify the identity of a current user associated with the client application 102 is intended recipient of the message. Additionally, if the message is part of a persisted data group, the manager component 112 can implement and verify that the message is transmitted in a proper order. Further, if the message includes time stamping, the manager component 112 can also verify that the message has not expired.

Once the data can be forwarded to the client application 102, the manager component 112 calculates a routing path for the message. In one embodiment of the present invention, the manager component 112 may select a routing path outside of the mobile device 1000 such that the message is reprocessed for delivery to protocol component 114 (FIG. 2). Alternatively, and as illustrated in FIG. 4, if the routing path relates to a client application 102, the manager component 112 selects an AIC 104 corresponding to the specific client application 102 and transmits the message to the AIC 104, which then forwards the message to the client application 102.

FIG. 5 is a block diagram illustrative of a message 500 including various communication, processing, and routing data streams utilized by the remote client application bridge and the server-based application bridge components in accordance with the present invention. In an illustrative embodiment of the present invention, the message includes a message data stream 502 including the data, instructions, etc. that is transferred from one application program to another. For example, the message data stream 502 can include data, such as word processing data, that will be processed by a particular application program. Additionally, the message data stream 502 can include computer-executable instructions that can be executed as part of the application program. For example, the message data stream 502 can include computer-executable instructions for a gaming application being executed on the mobile device 1000. Still further, in one embodiment of the present invention, the message data stream 502 can include multiple data payloads on a single message. Accordingly, different portions of an application program may process different portions of the message data stream 502 without requiring separate messages 500.

In addition to the message data stream 502, the message includes a number of data streams for facilitating the processing of the message by a number of application bridges. More specifically, the message 500 includes an instruction payload 504 that provides instructions for grouping the message with other messages or identifying the message as part of a persisted group of messages. The message 500 also includes a routing data stream 506 for providing destination and routing information to the application bridge. As will be explained in greater detail below, in one embodiment of the present invention, the routing data stream 506 does not include a selected routing path for the message, but rather one or more end point destinations for the message. Accordingly, the application bridge determines a routing path based on current routing availability. Additionally, the message 500 can include a routing log data stream 508 for storing data from each application bridge routing the message. The routing log data stream 508 may be utilized for error processing associated with delayed message processing or missed message processing.

The message 500 can further include a transforms data stream 510 including transformation instruction for the application bridge. In an illustrative embodiment of the present invention, the transformation components 108, 124 (FIG. 1) read from the transforms data stream 510 to determine how the message should be processed. The message 500 can also include a transforms log data stream 512 for storing data from each application bridge processing the message 500.

One skilled in the relevant art will appreciate that the message 500 can include any number of additional or alternative components. For example, the message 500 can include a state component for storing data regarding the current state of processing for the message. Additionally, the message 500 may omit one or more of the components, such as the transforms data stream 510, depending on the implementation of the application bridge.

Figure 7A:
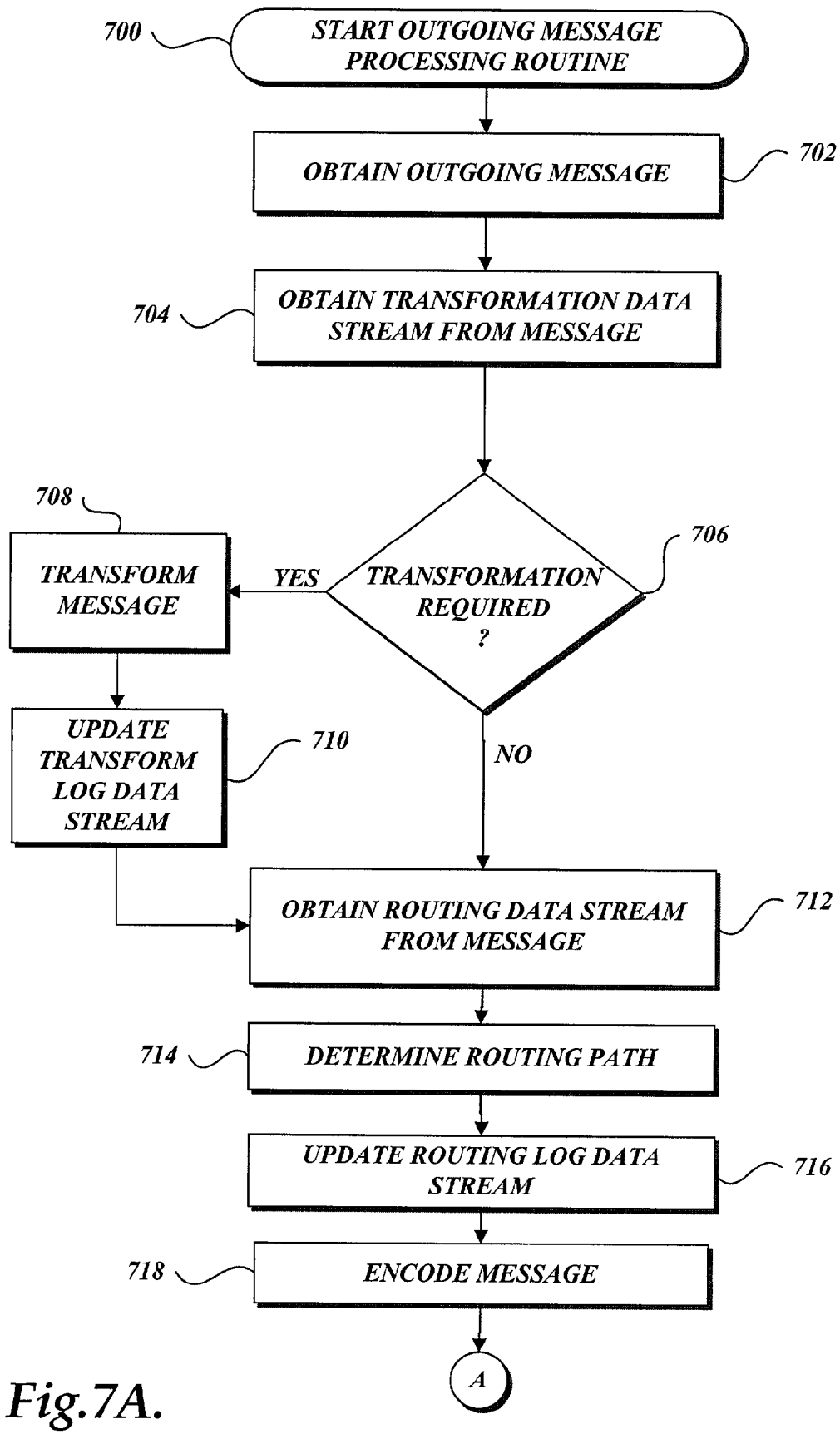
FIGS. 7A and 7B are flow diagrams illustrative of an outgoing message processing routine implemented by an application bridge in accordance with the present invention.
Figure 7B:
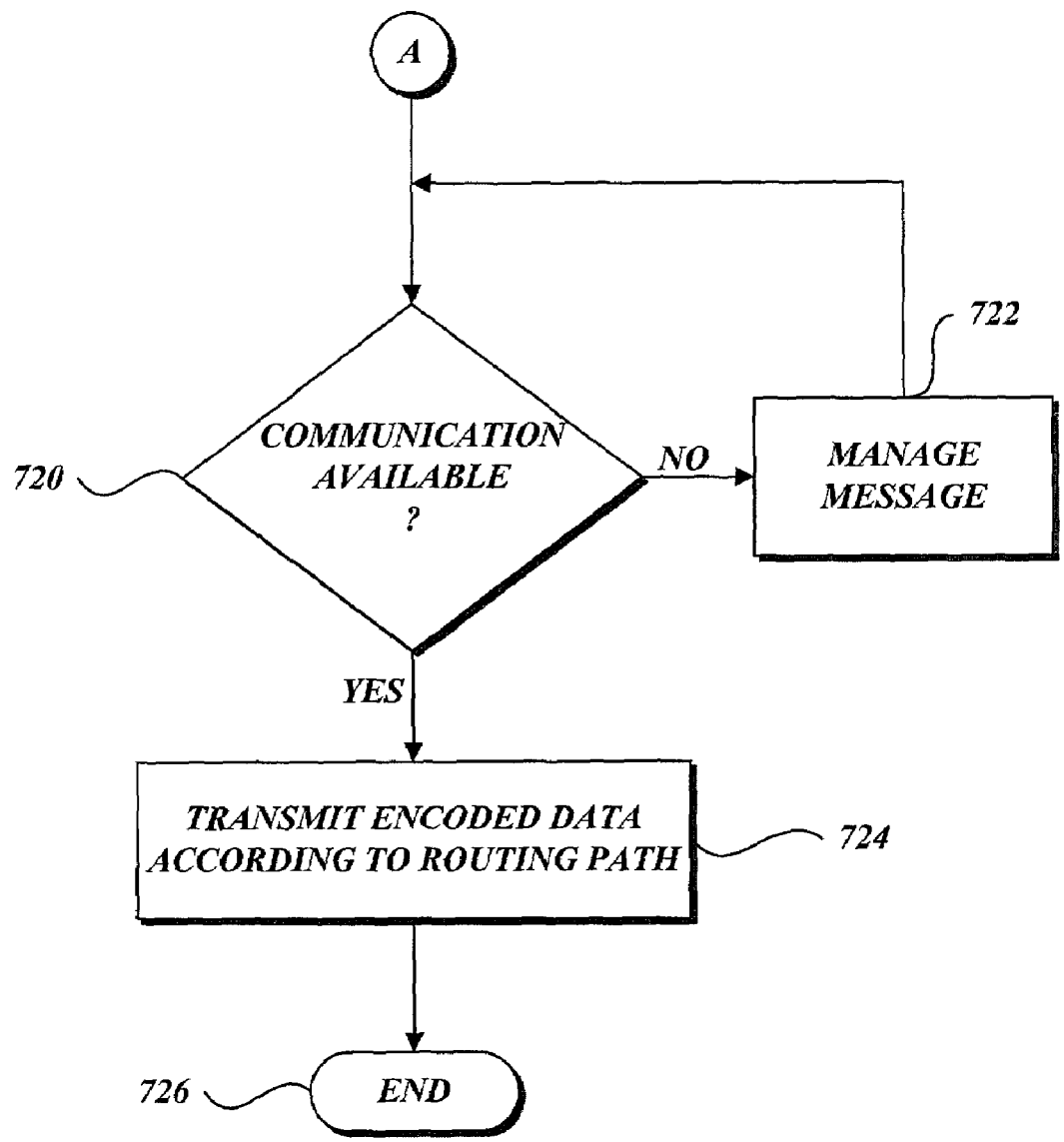

With reference now to FIGS. 7A and 7B, a routine 700 implemented by various components of an application bridge for processing an outgoing message will be explained. Although routine 700 will be explained with regard to application bridge components for a remote client application bridge, the routine may be implemented by a server-based application bridge. With reference to FIG. 7A, at block 702, the client API component 106 obtains an outgoing message from the client application 108. In an illustrative embodiment of the present invention, the client application 108 generates a message 500 that includes the message data stream 502 and any number of applicable processing data streams. In the illustrative example, the client application 108 generates a message 500 including data for the instructions data stream 504, the routing data stream 506 and the transforms data stream 510.

At block 704, the client API component 106 obtains transformation information from the transforms data stream 508. At decision block 706, a test is conducted to determine whether transformation is required. If no transformation is required, the routine 700 proceeds to block 712, which will be described below. Alternatively, if a transformation is required, at block 708, the transformation component 108 transforms the message data stream 502 according to the instructions listed in transforms data stream 510 (FIG. 5). In an illustrative embodiment of the present invention, the transformation component 108 may compress the message 500, encrypt the message 500, convert sonic of the data in the message data stream 502 into a different format, and perform other similar data processing. At block 710, the transforms log 510 is updated to reflect processing provided by the transformation component 108. The transformed message may be maintained in the data store component 110.

At block 712, the manager component 112 obtains routing information from the message and determines a routing path at block 714. In an illustrative embodiment of the present invention, the manager component 112 determines the routing path based on a specification in the routing data stream 504 (FIG. 5) of one or more destinations for the message 500. More specifically, the manager component 112 determines a routing path by referring to routing tables that specify one or more network logical locations and routing paths for those locations.

FIG. 6 is a block diagram of a routing table 600 utilized by a manager component 112 to determine a routing path in accordance with the present invention. The routing table 600 includes two device columns 602, 604 for specifying the origination location and destination location of the message. The routing table 600 also includes a column 606 for specifying a routing path and a column 608 for specifying a scoring or ranking system for prioritizing routing paths. The routing table 600 includes a number of rows for specifying routing paths between logical destinations. For example, row 610 specifies that the origination location is "MYDEVICE," the destination is "MYPC," the routing path is "ACTIVE SYNC," and the score for this routing path is "1." Row 612 specifies the same origination and destination location as row 610, but specifies a routing path of "HTTP" and a score of "2." Accordingly, because there are two possible routing paths from "MYDEVICE" to "MYPC," the manager component 112 would select the routing path with the highest priority or the highest score. Moreover, in an alternative embodiment of the present invention, the routing table 600 scores 608 may be dynamically modified based on factors such as connectivity, past performance, and the like.

In an illustrative embodiment of the present invention, the routing table 600 may have incomplete data for all possible network connections. For example, in FIG. 6, rows 614 and 616 indicate that the routing table 600 does not have routing paths for "MYPC" to "SERVER" or "SERVER" to "APP." In this embodiment, the manager component 112 would select one of two complete routing paths and forward the message to a known destination (e.g., "MYPC"). In this case, the known destination would receive the incoming message and forward it to one of its known destinations, which may or may not include the final destination. Thus, neither the message 500 nor the manager component 112 needs to specify the complete routing path.

Returning to FIG. 7A, at block 716, the routing log component 716 is updated to reflect the routing selected routing path. In an illustrative embodiment of the present invention, the routing log component 716 may be utilized for error checking as to delays in transmitting/receiving messages. If a message is lost along the routing path, the routing log should be able to determine which application bridge handled the message along the routing path. At block 718, the outgoing message is encoded for transmission by the protocol component 114 according the selected routing path. In an illustrative embodiment of the present invention, HTTP may be the communication protocol and the message 500 would be processed for transmission utilizing HTTP. Alternatively, any number of communication protocols may be utilized and additional processing may occur as needed.

With reference now to FIG. 7B, at decision block 720, a test is conducted to determine whether the selected routing path is available. In an illustrative embodiment of the present invention, the mobile device 1000 may have intermittent network communication connectivity. For example, if the mobile device 1000 includes an output for direct wired connection to a personal computer, this connection would be available as long as the wired connection is available. Likewise, if the mobile device includes a wireless connection, such as an IEEE 802.11b wireless network, the connection would only be available if the mobile device 1000 can receive and transmit data to the wireless data.

If the routing path is not available, at block 722 the manager component manages the outgoing message and the routine 700 returns to decision block 720 to determine routing path availability. In one embodiment of the present invention, the outgoing message may be maintained in the data store component 110 until the routing path becomes available. In another embodiment of the present invention, the manager component 112 may attempt to select another possible routing path if the previously selected routing path is unavailable. In still another embodiment of the present invention, if the outgoing message 500 includes an instruction in the instruction data stream 504 that the data is condition sensitive (e.g., time sensitive, user remains connected, etc.), the manager component 112 may verify the continued validity of the message 500. Accordingly, the manager component 112 would not attempt to retransmit if the condition had been satisfied. In yet another embodiment of the present invention, the manager component 112 may make the outgoing stream data available to the remote client application 102 for further modification until the selected routing path becomes available.

Once the routing path is available, at block 724, the protocol component 114 transmits the encoded message along the selected routing path. At block 726, the routine 700 terminates. One skilled in the relevant art will appreciate that additional or alternative blocks may be include in an outgoing processing stream. Likewise, some blocks may be omitted depending on the implementation of the application bridge.

Figure 8A:
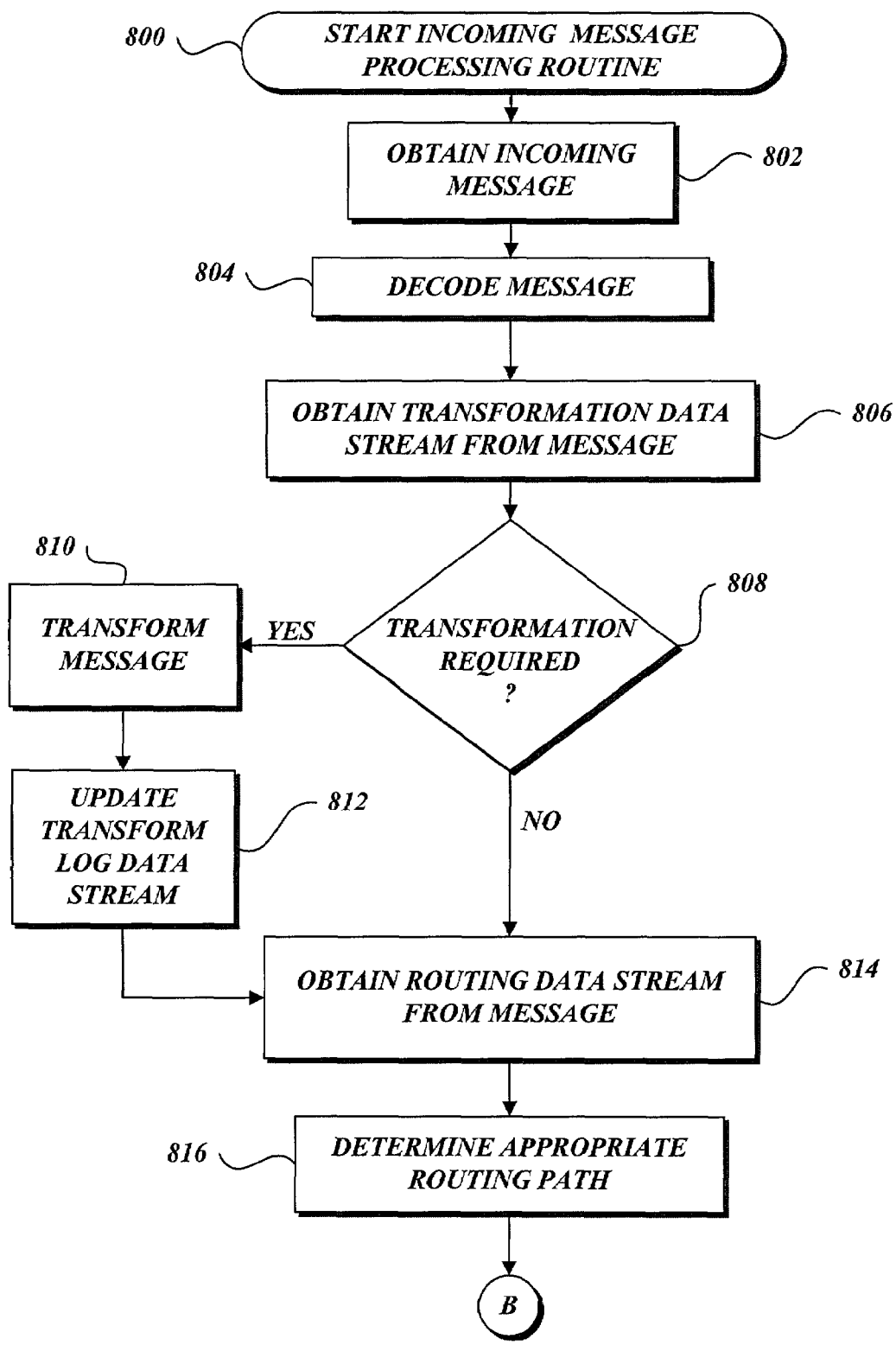
FIGS. 8A and 8B are flow diagrams illustrative of an incoming message processing routine implemented by an application bridge in accordance with the present invention.
Figure 8B:
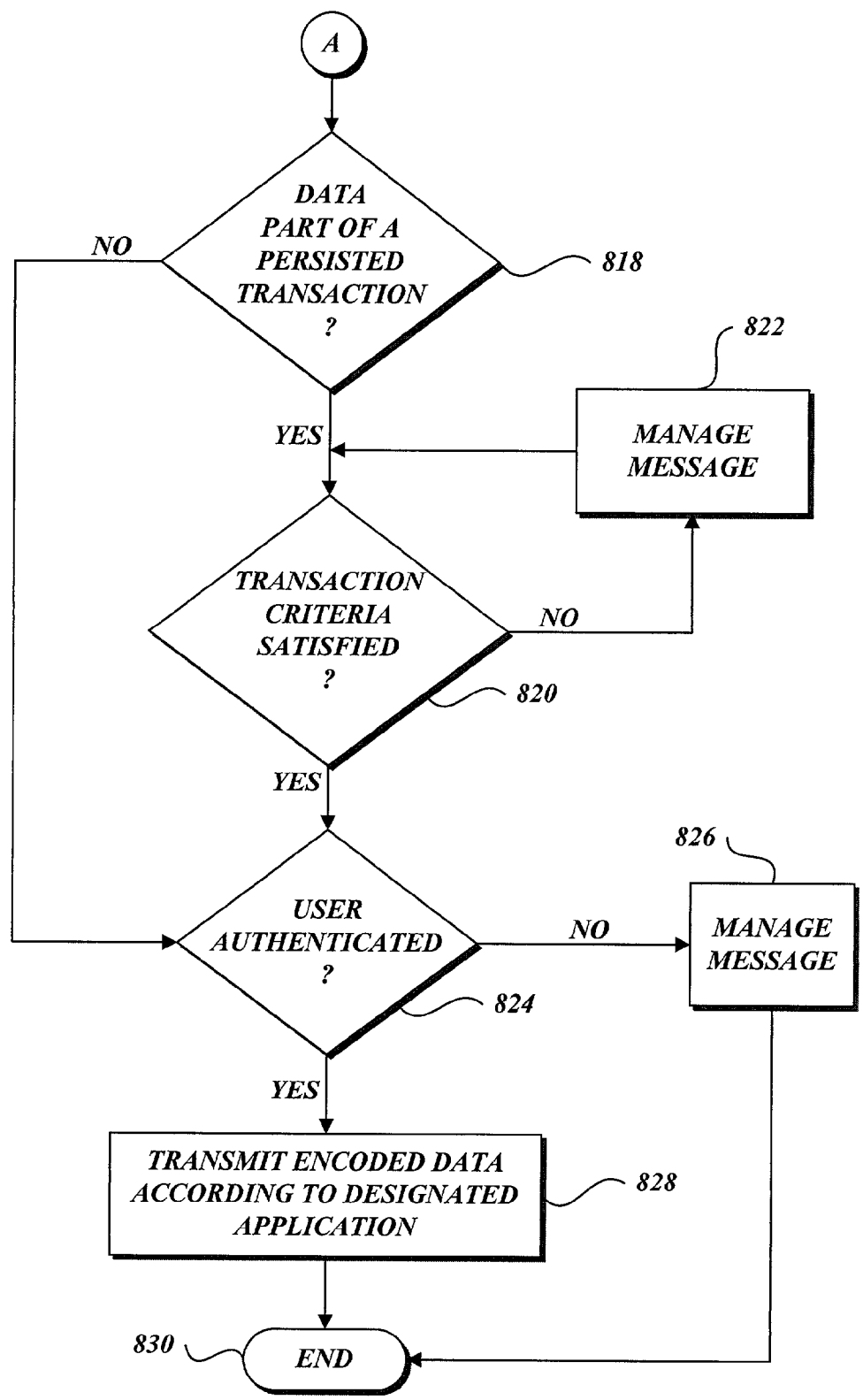

With reference now to FIGS. 8A and 8B, a routine 800 implemented by various application bridge components for processing an incoming message in accordance with the present invention will be described. Similar to routine 700 (FIG. 7), although routine 800 will be explained with regard to the application bridge components for a remote client application bridge, the routine may be implemented by a server-based application bridge. With reference to FIG. 8A, at block 802, protocol component 114 obtains an incoming message and decodes the message according to the specific protocol at block 804. In an illustrative embodiment of the present invention, the decoded message is stored in the data store component 110, which in turns notifies the manager component 112.

At decision block 806, the transformation component 108 obtains the transformation information from the message. In an illustrative embodiment of the present invention, the transformation information is obtained from the transforms data stream 508 of the message 500. At decision block 808, a test is conducted to determine whether one or more transformations are required. In an illustrative embodiment of the present invention, the incoming message may be compressed, encrypted, or otherwise processed. Accordingly, the transformation component 112 may process the data to remove the processing previously applied during the transmission of the message. If transformation is required, at block 810, the transformation component transforms the message and updates the transforms log data stream 512 of the message 500 at block 812. The transformed message may be stored in the data store component 110.

At block 814, the manager component 112 obtains routing information from the routing data stream 506 of the message 500. At block 816, the manager component 112 determines a routing path for the incoming message 500. As described above with regard to block 714 (FIG. 7), in an illustrative embodiment of the present invention, the manager component utilizes a routing table, such as routing table 600 (FIG. 6) to determine a routing path for the incoming message. In one embodiment, the routing path may require that the message be sent to a remote logical location. In another embodiment, the routing path will indicate a local client application 102. In this embodiment, illustrated in FIG. 4, the manager component 112 would select an appropriate AIC 104.

In an actual embodiment of the present invention, the manager component 112 may conduct one or more additional tests prior to transmitting the message to the client application 102. With reference now to FIG. 8B, at decision block 818, a test is conducted to determine whether data is part of a persisted transaction group. In one embodiment of the present invention, the instruction data stream 504 may indicate that two or more messages must be delivered to the client application 102 in a particular order. In another embodiment of the present invention, the instruction data stream 504 may indicate that two or more messages must be delivered to the client application 102 or not at all. If the message is part of a transaction, at decision block 820, a test is conducted to determine whether the transaction criteria are satisfied. If the transaction criteria have not been satisfied, at block 822, the manager component 112 manages the message. In an illustrative embodiment of the present invention, the manager component 112 may wait a predetermined amount of time for the other messages. Additionally, if the instruction data stream 504 indicates that the message may expire, the manager component 112 may verify the validity of the message.

If the message is not part of a transaction at decision block 818, or if the transaction criteria have been satisfied at decision block 820, at decision block 824, a test is conducted to determine whether a user associated with the remote-client application can be authenticated. In an illustrative embodiment of the present invention, multiple users may be associated with a mobile device 1000. Accordingly, data designated for a particular user utilizing the client application 102 should not be delivered to the client application 102 unless the identity of the particular user can be verified. If the user cannot be authenticated, at block 826, the manager component 112 manages the message. In an illustrative embodiment of the present invention, the manager component 112 may delete the data, return an error message and/or return the message.

If a user can be authenticated at decision block 824, the manager component transmits the message to the selected AIC 104, which transmits the message to the client application 102. At block 828, the routine 800 terminates. In some embodiments of the present invention, some blocks of routine 800 may be substituted, modified or eliminated. For example, the user authentication of decision block 824 may be omitted for server-based application bridges not associated with a particular user. Likewise, the transformation blocks 810 may be omitted.

In accordance with the present invention, mobile device application bridges may be applicable in a variety of intermittent communication environments. Generally described, three communication environment descriptions may be utilized to model specific implementation scenarios for mobile devices having an application bridge.

A first communication environment can be referred to as "Mostly Connected" and refers to situations in which a mobile device 1000 maintains at least one connection with a network for a large percentage of time, with only short term interruptions of connectivity. One embodiment of a "Mostly Connected" environment may be a geographic location having mobile devices 1000 within the location, such as a warehouse, retail and commercial sales locations, and the like. One skilled in the relevant art will appreciate that other implementations may also experience a "Mostly Connected" environment.

In accordance with an illustrative example of a "Mostly Connected" warehouse environment, one or more users may be associated with mobile devices 1000. Each mobile device may communicate with the communication network via a wireless LAN, such as an IEEE 802.11 wireless network. The users log into the network via the mobile device and generates/receives data. For example, a user may scan product stock keeping unit ("SKU") bar codes as part of an inventory management process. If the mobile device 1000 loses wireless connectivity, the application bridge can manage incoming and outgoing messages accordingly. Additionally, because the communication network is likely high bandwidth, centralized, private network, the application bridge may omit some transformation aspects such as data compression and encryption. Further, because multiple users may utilize the same mobile device 1000, user authentication may be utilized.

Another communication environment can be referred to as "Casually Connected" and refers to situations in which a mobile device 1000 maintains at least one connection with a network for some percentage of time, with some identifiable interruptions in connectivity. One embodiment of a "Casually Connected" environment may include a delivery scenario in which one or more users associated with a mobile device 1000 communicate with one another or a centralized data source. One skilled in the relevant art will appreciate that other implementations may also experience a "Casually Connected" environment.

In accordance with an illustrative example of a "Casually Connected" delivery environment, one or more users may be associated with mobile devices 1000. Each mobile device may communicate with the communication network via a wireless WAN such as a cellular or satellite communication network. Because the mobile devices may be utilized by a variety of users, each user logs into the network via the mobile device 1000 and generates/receives data. For example, a delivery person may broadcast current location information with assist of a global positioning system ("GPS") component, obtain confirmation signatures for a successful delivery, may register a failed delivery, and input changed customer orders. Additionally, the delivery person may be able to access current inventory records for available inventory. In this illustrative embodiment, because the wireless network may be a slower bandwidth, public network, the application bridge may utilize data compression and data encryption to manage messages. Further, because users may share mobile devices 1000, user authentication may be utilized.

Yet another communication environment can be referred to as "Seldom Connected" and refers to situations in which a mobile device 1000 maintains at least one connection with a network for a small percentage of time, with some substantial interruptions in connectivity. One embodiment of a "Seldom Connected" environment may include a device, such as a snack machine, having some computing components that can communicate with a centralized data source, but that does have constant direct connection. One skilled in the relevant art will appreciate that other implementations may also experience a "Seldom Connected" environment.

In accordance with an illustrative example of a "Seldom Connected" environment, one or more devices include computing resources operable to monitor and report inventory levels. Each device may communicate with the communication network via a wireless WAN such as a cellular or satellite communication network or a direct communication link when there is data to report. For example, the device may record inventory levels, but report the inventory levels to the server-based application if a low inventory, or other error situation occurs. Alternatively, the device may collect data for a specific period of time prior to transmitting the data. Accordingly, the application bridge can manage the incoming and outgoing messages until a communication channel can be established. In this illustrative embodiment, because the device is not associated with users, the application bridge may omit security authorization. However, because the device may rely on public, slower bandwidth communication networks, the application bridge may utilize data compression and data encryption to manage messages.

One skilled in the relevant art will appreciate that alternative embodiments of the present invention may also utilize a combination of communication embodiments. For example, one embodiment, such as a delivery and warehouse embodiment, a mobile device 1000 may encounter a "Mostly Connected" environment when a user is adjacent to a wireless LAN, such as on-premises. On other occasions, such as during a delivery route, the mobile device 1000 may encounter a "Casually Connected" environment. In such an embodiment, the application bridge on the mobile device 1000 may adjust the processing of the messages according to the particular communication environment.

With reference once again to FIG. 1, in an alternative embodiment of the present invention, the components of the client-based application bridge and the server-based application bridge may be implemented as distributed software components accessible via the communication network 116. An example of a distributed application development and execution platform is the Microsoft® .NET platform from Microsoft® Corporation of Redmond, Wash. Generally described, the Microsoft® .NET platform is an application programming and execution platform that provides write-once, compile-once, run-anywhere application development. Microsoft® .NET platform applications may be created in any language as long as they are compiled by a compiler that targets the Microsoft® .NET universal runtime ("URT"), also known as the common language runtime engine. Such a compiler compiles .NET applications into intermediate language ("IL"), rather than directly into executable code.

To execute a .NET platform application, the compiled IL is interpreted, or "just-in-time" compiled, by the URT into native machine instructions. The native machine instructions can then be directly executed by the CPU. The Microsoft® .NET platform also includes a base library that comprises a large set of class libraries and services. These libraries and services provide access to the features of the URT, and other high-level services, so that software developers do not have to code the same services repeatedly. Although the present invention may be applicable with regard to a .NET platform implementation, the present invention may also be applicable in alternative distributed applications.

In accordance with a distributed platform embodiment, at least some of the application bridge components, such as the transformation components 108, 124, the data store component 110, 122, the protocol component 114, 118 and/or the AIC 104, 128, may be offered as a service component. The components may be maintained as application bridge function-specific components. Alternatively, the components may be part of a general component that is operable to provide application bridge functionality. For example, the protocol components 114, 118 may be an application bridge specific service component offered via the communication network 116. Alternatively, either of the protocol components 114, 118 may be part of a general protocol component that can provide the protocol functionality of the application bridges. In an illustrative embodiment of the present invention, the client-based application bridge and the server-based application bridge may utilize one or more of the same distributed components.

In accordance with a distributed component embodiment, each application bridge component may be hosted by different third party vendors and may be located remote from one another. Additionally, the application bridge may include one or more additional components, such as a routing manager component or coordinator component, to implement the application bridge in distributed manner. Still further, one or more AIC 128 may correspond to distributed server-based applications hosted as part of a distributed computing network.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer system for communications management and data exchange, the computer system comprising:
   a communication network operable to facilitate the transmission of messages, the messages including one or more message data streams and one or more processing data streams;
   a remote client computing device in intermittent communication with the communication network, said remote client computing device including at least one client-based application and a client-based application bridge, said remote client computing device having a current routing availability; and
   a server-based computing device in communication with the communication network, said server-based communication device including at least one server-based application and a server-based application bridge;
   wherein the client-based application bridge is operable to determine a routing path for the messages based on the current routing availability of the remote client computing device;
   wherein the server-based application is operable to generate messages for the client-based application and wherein the client-based application is operable to generate messages for the server-based application; and
   wherein the client-based application bridge and the server-based application bridge are operable to manage the transmission of messages between the client-based application and the server-based application when the remote client computing device is not in communication with the communication network and content within the messages can be modified at any time before transmission of the messages.

2. The computer system as recited in claim 1, wherein the messages also include transformation information and wherein the client-based application bridge includes a transformation component operable to transform messages.

3. The computer system as recited in claim 2, wherein the transformation component is operable to compress the messages.

4. The computer system as recited in claim 2, wherein the transformation component is operable to encrypt the messages.

5. The computer system as recited in claim 1, wherein the client-based application bridge includes a manager component operable to manage a state of messages being processed by the client-based application bridge.

6. The computer system as recited in claim 5, wherein the messages also include routing information and wherein the manager component is further operable to determine a routing path for messages being processed by the client-based application bridge.

7. The computer system as recited in claim 6, wherein the manager component is further operable to append the determined routing path to routing information in the message.

8. The computer system as recited in claim 5, wherein the messages also include processing instructions and wherein the manager component is further operable to determine an order for delivery of the messages.

9. The computer system as recited in claim 1, wherein the client-based application bridge includes an API component operable to interface with the client-based application.

10. The computer system as recited in claim 1, wherein the client-based application bridge includes a protocol component operable to interface with the communication network.

11. The computer system as recited in claim 1, wherein the client-based application bridge includes an application integration component operable to transmit messages to the client-based application.

12. The computer system as recited in claim 1, wherein the messages also include transformation information and wherein the server-based application bridge includes a transformation component operable to transform messages.

13. The computer system as recited in claim 12, wherein the transformation component is operable to compress the messages.

14. The computer system as recited in claim 12, wherein the transformation component is operable to encrypt the messages.

15. The computer system as recited in claim 1, wherein the server-based application bridge includes a manager component operable to manage a state of messages being processed by the server-based application bridge.

16. The computer system as recited in claim 15, wherein the messages also include routing information and wherein the manager component is further operable to determine a routing path for messages being processed by the server-based application bridge.

17. The computer system as recited in claim 16, wherein the manager component is further operable to append the determined routing path to the routing information in the message.

18. The computer system as recited in claim 1, wherein the server-based application bridge includes an API component operable to interface with the server-based application.

19. The computer system as recited in claim 1, server-based application bridge includes an application integration component operable to transmit messages to the server-based application.

20. The computer system as recited in claim 19, wherein the application integration component is operable to transmit messages to a distributed server-based application.

21. The computer system as recited in claim 1, wherein the server-based application bridge includes a protocol component operable to interface with the communication network.

22. The computer system as recited in claim 1, wherein the remote client device is a mobile device.

23. The computer system as recited in claim 22, wherein the communication network is a wireless communication network.

24. The computer system as recited in claim 23, wherein the wireless communication network is an IEEE 802.11b wireless network.

25. The computer system as recited in claim 22, wherein the communication network is a combination wireless and wired communication network.

26. The computer system as recited in claim 1, wherein the client-based application is a word processing application program.

27. The computer system as recited in claim 1, wherein the client-based application is an electronic communication application program.

28. A computer-readable storage medium having computer-executable components for communications management, comprising:
    a manager component operable to manage the processing of a message and determine a routing path for the message based on connectivity with a communications network;
    a data store component in communication with the manager component and operable to store messages;
    a protocol component in communication with the manager component and operable to communicate with the communications network, wherein communication with the communications network is intermittent; and
    an application protocol interface component operable to interface with an application program that generates and receives messages.

29. The computer-readable storage medium as recited in claim 28 further comprising a transformation component operable to obtain transformation information from a message and process the message according to the transformation information.

30. The computer-readable storage medium as recited in claim 28, wherein the manager component is further operable to obtain routing information from the message and determine a routing path for the message based on said routing information.

31. The computer-readable storage medium as recited m claim 28 further comprising an application integration component operable to interface with an application program.

32. The computer-readable storage medium as recited in claim 31, wherein the application integration component is operable to interface with a distributed application program.

33. The computer-readable storage medium as recited in claim 28, wherein at least one of the computer-executable modules are provided as part of a distributed application.

34. A system for communications management and data exchange, wherein a communication network is operable to facilitate the transmission of messages between a mobile computing device and a second computing device, said messages including one or more message data streams and one or more processing data streams, wherein the mobile computing device is running at least a first application and the second computing device is running at least a second application, comprising:
    a first application bridge in the mobile computing device, wherein the first application bridge is operable to determine a routing path for the messages based on the current routing availability of the first computing device; and
a second application bridge in the second computing device;
wherein the first application bridge and the second application bridge are operable to manage the transmission of messages between the first application and the second application when the mobile computing device is in intermittent communication with the communication network;
wherein the first and second application bridges each comprise:

an application protocol interface for providing an interface to the first or second application for incoming and outgoing messages,
a transformation component for transforming messages,
a data store component for storing incoming and outgoing messages,
a manager component for managing the state transitions of the incoming and outgoing messages, and
a protocol component to facilitate the exchange of data between the first or second computing device and the communication network.

* * * * *

UNITED STATES PATENT AND TRADEMARK OFFICE
CERTIFICATE OF CORRECTION

PATENT NO. : 7,584,241 B2
APPLICATION NO. : 10/102560
DATED : September 1, 2009
INVENTOR(S) : Kureshy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Fourteenth Day of September, 2010

David J. Kappos
*Director of the United States Patent and Trademark Office*